(12) United States Patent
Komatsubara

(10) Patent No.: US 11,317,602 B2
(45) Date of Patent: *May 3, 2022

(54) PET BED

(71) Applicant: UNICHARM CORPORATION, Ehime (JP)

(72) Inventor: Daisuke Komatsubara, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 705 days.

This patent is subject to a terminal disclaimer.

(21) Appl. No.: 16/307,991

(22) PCT Filed: Aug. 8, 2016

(86) PCT No.: PCT/JP2016/073335
§ 371 (c)(1),
(2) Date: Dec. 7, 2018

(87) PCT Pub. No.: WO2017/212658
PCT Pub. Date: Dec. 14, 2017

(65) Prior Publication Data
US 2019/0183090 A1 Jun. 20, 2019

(30) Foreign Application Priority Data
Jun. 8, 2016 (JP) .............................. JP2016-114673

(51) Int. Cl.
*A01K 1/035* (2006.01)
*A01K 1/015* (2006.01)

(52) U.S. Cl.
CPC .......... *A01K 1/0353* (2013.01); *A01K 1/0157* (2013.01)

(58) Field of Classification Search
CPC .. A01K 1/0353; A01K 1/0254; A01K 1/0272; A01K 1/029; A01K 1/0281;
(Continued)

(56) References Cited

U.S. PATENT DOCUMENTS 1,887,108 A * 11/1932 Steese .................. A01K 1/0353
119/482
2,032,248 A * 2/1936 Bins ..................... A01K 1/0353
119/482
(Continued)

FOREIGN PATENT DOCUMENTS

EP 3456183 A1 3/2019
JP 2002-191247 A 7/2002
(Continued)

OTHER PUBLICATIONS

Translation of DE 202004013058.*
Translation of WO 8705784.*

*Primary Examiner* — Thanh Pham
(74) *Attorney, Agent, or Firm* — Hauptman Ham, LLP

(57) ABSTRACT

A pet bed includes a frame body having cushioning properties and a mat surrounded by the frame body and having cushioning properties. The mat has a top surface and a thickness. The frame body has a thickness that is greater than the thickness of the mat. The pet bed has a height in the thickness direction of the mat. The height is greater than the mat at the frame body. The mat has a fiber structure formed of thermoplastic resin fibers having an average fiber diameter of 0.01-5 mm. When the frame body and the mat are compressed under the same pressure, the decrease in the thickness of the mat due to the compression is smaller than the decrease in the thickness of the frame body due to the compression.

9 Claims, 8 Drawing Sheets

(58) Field of Classification Search
CPC ...... A01K 1/0157; A01K 23/00; A01K 27/00; A01K 1/0107
See application file for complete search history.

(56) References Cited

U.S. PATENT DOCUMENTS

| | | | | |
|---|---|---|---|---|
| 3,232,270 | A * | 2/1966 | Sweeney, Jr. | A01K 1/0353 119/28.5 |
| 3,683,916 | A * | 8/1972 | Mesek | A61F 13/49406 604/365 |
| 4,961,930 | A * | 10/1990 | Perdelwitz, Jr. | A01K 1/0353 119/28.5 |
| 5,000,116 | A * | 3/1991 | Fife | A01K 1/0353 119/28.5 |
| 5,197,411 | A | 3/1993 | Schwarzenbart | |
| 5,311,837 | A * | 5/1994 | Mamer-Boellstorff | A01K 1/0353 119/28.5 |
| 5,588,393 | A * | 12/1996 | Heilborn | A01K 1/0353 119/28.5 |
| 5,603,284 | A * | 2/1997 | Freedman | B65B 31/00 119/28.5 |
| D386,832 | S * | 11/1997 | McAlister | D30/118 |
| 5,724,911 | A | 3/1998 | McAlister | |
| 5,765,502 | A * | 6/1998 | Haugh | A01K 1/0353 119/28.5 |
| 6,227,145 | B1 * | 5/2001 | Miyamoto | A01K 1/0107 119/172 |
| 7,231,888 | B1 * | 6/2007 | Kelly | A01K 1/0353 119/161 |
| D563,058 | S * | 2/2008 | Lamstein | D30/118 |
| 2009/0031959 | A1 | 2/2009 | Crowley | |

FOREIGN PATENT DOCUMENTS

| | | |
|---|---|---|
| JP | 2004-16145 A | 1/2004 |
| JP | 2006-180793 A | 7/2006 |
| JP | 2007-181725 A | 7/2007 |
| JP | 2009-118791 A | 6/2009 |
| JP | 4422604 B2 | 2/2010 |
| JP | 3191888 U | 7/2014 |
| JP | 2014-168400 A | 9/2014 |

* cited by examiner

PET BED

RELATED APPLICATIONS

The present application is a National phase of International Application Number PCT/JP2016/073335, filed on Aug. 8, 2016, and claims priority to Japanese Application No. 2016-114673, filed on Jun. 8, 2016

FIELD

The present invention relates to a pet bed, and more specifically it relates to a bed for a pet such as a dog, having a mat enclosed by a frame body.

BACKGROUND

Pet beds are known that have a mat enclosed in a frame body, wherein the frame body is thicker and higher than the mat (PTLs 1 to 4, for example). PTL 1 discloses a pet bed comprising a frame member and a block body as the bed main body, the frame member and block body being made of expandable plastic with a cushioning property. PTL 2 discloses a cat bed comprising a cushion member and a surrounding pillow member, the density of cotton in the pillow member being higher than the cushion member, and the pillow member having a stiffer construction than the cushion member. PTL 3 discloses a pet bed comprising an air-permeable cushion member on a main cushion member, and in FIG. 3 it shows the bed comprising an elevated section at an edge, wherein the main cushion member and the air-permeable cushion member, including the elevated section, are made of the same material. PTL 4 discloses a pet mat having a base exhibiting a buffer function, with a space section in which an approximately concave space is formed opening upward and having depth in the bottom face direction, and a cover member formed of an air-permeable material, covering the space section.

CITATION LIST

Patent Literature

[PTL 1] Japanese Patent Publication No. 4422604
[PTL 2] Japanese Unexamined Patent Publication No. 2002-191247
[PTL 3] Japanese Unexamined Patent Publication No. 2004-16145
[PTL 4] Japanese Unexamined Patent Publication No. 2014-168400

SUMMARY

Technical Problem

As explained above, in all of the conventional pet beds having a mat enclosed in a frame body, the mat is constructed of either the same material as the frame body or a softer material than the frame body. For dogs or other pets that have weak joints, for which walking on a soft mat is difficult, this has therefore been a problem in that it tends to damage the joints. In addition, since the mat becomes partially dented in response to partially applied body pressure, the hip bone is partially subjected to force when lying down, tending to produce bedsores.

It is therefore an object of the present invention to provide a pet bed that is easy to walk on, is unlikely to damage joints, and has high walking stability, for a pet such as a dog.

Solution to Problem

As a result of diligent research directed toward solving the problems described above, the present inventors have found that for a pet bed having a mat enclosed in a frame body, if the hardness of the mat is made to be higher than that of the frame body, then it is possible to provide a pet bed that has a reduced depth through which pet legs sink into the mat, and that is easy to walk on, is unlikely to damage joints, and has high walking stability for pets, and we have completed this invention.

The aspects of the present invention that solve the aforementioned problems are the following, without being limitative.

(Aspect 1)

A pet bed having a frame body with a cushioning property and a mat with a cushioning property enclosed in the frame body, wherein
the frame body and the mat each have a height,
the height of the frame body is higher than the height of the mat,
the mat has a fiber structure composed of thermoplastic resin fibers having an average fiber diameter of 0.01 to 5 mm, and
when the frame body and the mat are compressed under the same pressure, the reduction in thickness of the mat when compressed is smaller than the reduction in thickness of the frame body when compressed.

<Effect> A pet bed wherein the periphery of a mat with a cushioning property serving as the bed floor is enclosed by a tall frame body with a cushioning property, provides the pet with an excellent feel during use, but while conventional pet beds have employed the same material as the frame body portion or a softer material in the mat portion, from the viewpoint of the cushioning property, a mat designed only for its cushioning property (elastic repulsion and particularly soft elastic repulsion that accepts and fits to the form of the pet's body under the body weight of the pet) has insufficient hardness and may result in problems of walking stability whereby the pet has difficulty walking and can suffer joint damage. In the bed of the invention, unlike the prior art, a material harder than the frame body is used for the mat, so that when the mat is subjected to pressure when the pet walks, the reduction in thickness of the mat when compressed (the sinking depth) is less than the reduction in thickness (the sinking depth) of the frame body when it is compressed by the same pressure, and therefore walking stability on the mat is increased and the pet can walk more easily with less likelihood of joint damage. Particularly with a structure in which the bed has a mat with a smaller thickness than a tall frame body, because of the smaller thickness of the mat, a soft mat will result in extra loss of walking stability and therefore a mat that is harder than the frame body is used to increase the walking stability, while the height of the frame body can also be lowered by the amount of reduction of the thickness of the mat, thereby making it easier for the pet to step over the frame body, and thus further reducing the burden on the pet's legs when it enters the bed.

By using a fiber structure composed of thermoplastic resin fibers having an average fiber diameter of 0.01 to 5 mm for the mat, it is possible to increase the hardness of the mat while also providing a hardness property that is excellent for both the cushioning property and the walking stability of the mat. Furthermore, even while lying down, the body pressure is diffused since sinking is by partial forces over the entire surface of the mat, and bedsores are prevented.

(Aspect 2)

The pet bed according to aspect 1, wherein when the frame body and the mat are compressed at a pressure of 15 kPa, the reduction in thickness of the mat when compressed is less than the reduction in thickness of the frame body when compressed.

<Effect> For pressure applied onto a mat by the legs of a pet when the pet walks, it was confirmed that a pressure of about 15 kPa (0.15 kgf/cm$^2$) may be assumed to be the pressure exerted on the mat by 4 legs of a regular small dog, and by comparing the reduction in thickness by compression of the mat and the frame body under the applied pressure it is possible to evaluate the hardness (sinking difficulty) of the mat and the frame body. As evaluated in a compression test based on the pressure of 4 legs of a pet, since the mat is more compressed than the frame body and has a lower reduction in thickness, an effect is provided whereby the walking stability on the mat is increased for the pet, the pet can walk more easily, and joint damage is less likely to occur.

(Aspect 3)

The pet bed according to aspect 1 or 2, wherein the mat has a planar direction and a thickness direction, and the fiber structure is a fiber structure that is joined at the intersections between the continuous fibers and does not include ends of the continuous fibers on the top surface.

<Effect> If the fiber structure that provides the cushioning property is a fiber structure that has the intersections between the continuous fibers joined and does not include ends of the continuous fibers on the top surface, then an effect will be provided whereby the fibers in the mat will not be maldistributed and will therefore be less likely to catch on the feet, and will also have less variation in compressibility, while discomfort caused by the ends of the discontinuous fibers contacting with the foot soles will also be reduced, and the pet will be unlikely to lose balance while walking. Furthermore, the body pressure dispersibility will be excellent, and the mat can exhibit a hardness property that is excellent in terms of both the cushioning property against pressure on the level of body pressure exerted when a pet, and especially a small dog, lies down, as well as walking stability for the pet.

(Aspect 4)

The pet bed according to any one of aspects 1 to 3, wherein the fiber structure has a thickness of 3 mm or greater when compressed at a pressure of 3.4 kPa.

<Effect> Since the cushioning property of the mat is exhibited by the fiber structure, if the thickness of the fiber structure is 3 mm or greater when it has been subjected to a pressure of about 3.4 kPa (35 gf/cm$^2$) due to body pressure when a pet, and especially a small dog, lies down, the mat can exhibit a sufficient cushioning property as a pet bed. Moreover, if the fiber structure has a thickness of 3 mm or greater when subjected to a load of about 3.4 kPa, the mat will retain a cushioning reserve force even against the load when a pet is walking, allowing even more excellent walking stability to be provided for the pet.

(Aspect 5)

The pet bed according to any one of aspects 1 to 4, wherein the reduction in thickness of the mat when compressed is no greater than 37 mm, when the mat has been compressed with a pressure of 15 kPa.

<Effect> Assuming the pressure applied to a mat by 4 legs of a pet when the pet is walking is a pressure of about 15 kPa (0.15 kgf/cm$^2$), as the pressure on the mat (fiber structure) by the 4 legs of a small dog, if the reduction in thickness of the mat when compressed under the pressure of 15 kPa (0.15 kgf/cm$^2$) is no greater than 37 mm, then the sinking depth of the legs of the pet while walking will be small enough so as not to be a burden for the pet, in the case of a small dog, and therefore the walking stability will be excellent for the pet and the legs of the pet can be protected.

(Aspect 6)

The pet bed according to any one of aspects 1 to 5, wherein the fiber structure has a reduction in thickness in the range of 13 to 22 mm when compressed at a pressure of 3.4 kPa, and the reduction in thickness is no greater than 35 mm when compressed with a pressure of 15 kPa.

<Effect> If the reduction in thickness is in the range of 13 to 22 mm when the fiber structure is compressed with a pressure of 3.4 kPa, then the fiber structure will have sufficient softness for receiving pressure when the pet lies down and will have a cushioning property to fit the body of the pet, and if the fiber structure has a reduction in thickness of no greater than 35 mm when compressed with a pressure of 15 kPa as according to aspect 5, then the sinking depth of the legs of the pet when the pet walks will be even less than according to aspect 5, thus resulting in even more excellent walking stability for the pet and allowing the legs of the pet to be protected.

(Aspect 7)

The pet bed according to any one of aspects 1 to 6, wherein the fiber structure has a surface layer on the top side of the mat and an inner layer directly under the surface layer, the density of the surface layer being greater than the density of the inner layer.

<Effect> Since the density of the surface layer of the fiber structure that contacts with the pet is higher than the density of the interior, the fiber structure has its flexibility maintained while the number of junctions between the fibers in the surface layer is increased, and the compressive load acting on the mat by the pet is diffused as the fibers surrounding the region contacting with the pet are engulfed, thus allowing the body pressure dispersibility to be increased and further reducing the degree of sinking of the body and legs of the pet under its body weight.

(Aspect 8)

The pet bed according to any one of aspects 1 to 7, wherein the fiber structure is composed of a laminate of two fiber structure layers comprising a layer containing no hollow fibers and a layer containing hollow fibers, the fiber structure layer containing no hollow fibers being disposed on the top side of the mat.

<Effect> If the fiber structure is composed of a laminate of two fiber structure layers comprising a layer containing no hollow fibers and a layer containing hollow fibers, and the fiber structure layer containing no hollow fibers is disposed on the top side of the mat, then the top side that contacts with the pet will have a soft cushioning property to fit the pet, while the bottom side of the fiber structure layer that does not contact with the pet can have increased hardness (strength) due to the presence of the hollow fibers, thus decreasing the degree of sinking of the fiber structure as a whole and allowing it to exhibit an excellent compression property in terms of walking stability for the pet.

(Aspect 9)

The pet bed according to any one of aspects 1 to 8, wherein the frame body has a reduction in thickness of 10 mm or greater under compression, when using a pressure plate having the angle of one plane of a 50 mm-diameter disc chamfered to a section radius of 10 mm (R10), and pressing the surface of the chamfered side of the pressure plate against the frame body to produce a load of 3.5 N on the pressure plate.

<Effect> When the hardness of the frame body is a hardness (softness) such that the frame body has a reduction in thickness of 10 mm or greater under compression when using a pressure plate having the angle of one plane of a 50 mm-diameter disc chamfered to a section radius of 10 mm (R10), and pressing the surface of the chamfered side of the pressure plate against the frame body to produce a load of 3.5 N on the pressure plate, the frame body has suitable hardness (softness) as a pillow or back rest for a pet, and especially a small dog.

(Aspect 10)

The pet bed according to any one of aspects 1 to 9, wherein the mat is inserted in a detachable manner into the frame body, and has a more excellent moisture drying property than the frame body.

<Effect> Since the mat is inserted in a detachable manner into the frame body and has a more excellent moisture drying property than the frame body, the mat which is easily fouled can be detached from the frame body for washing of the mat alone, and since the mat has a more excellent drying property, it is possible to shorten the time during which the dog is unable to use the bed due to washing and drying of the bed.

(Aspect 11)

The pet bed according to any one of aspects 1 to 10, wherein the mat has an approximately rectangular shape in the planar view and the frame body surrounds the approximately rectangular outer shape of the mat and has two long sides and two short sides that are each essentially mutually parallel, the frame body having on one of the long sides a frame body high part with a greater height than the other three sides.

<Effect> Since pets such as dogs habitually sleep along walls, providing the frame body with a high part allows it to be used as a back rest, while the two adjacent short sides of lower height than the back rest can be utilized as pillow members.

(Aspect 12)

The pet bed according to aspect 11, wherein the frame body has first frame body low parts on the two short sides and a second frame body low part on the other long side that extends essentially parallel to the frame body high part, and the second frame body low part has a lower height than the first frame body low parts.

<Effect> The first frame body low parts on both rectangular short sides adjacent to the frame body high part that functions as the back rest of the frame body are lower than the frame body high part and can thus function as pillows for the pet. The remaining side, other than the frame body high part that functions as the back rest and the first frame body low parts that function as pillows, as the second frame body low part, is lower than first frame body low parts that function as pillows, thus allowing the second frame body low part to suitably function as an entrance for the pet.

Advantageous Effects of Invention

According to the invention it is possible to provide a pet bed that is easy to walk on, is unlikely to damage joints, and has high walking stability, for a pet such as a dog.

DESCRIPTION OF EMBODIMENTS

Figure 1:
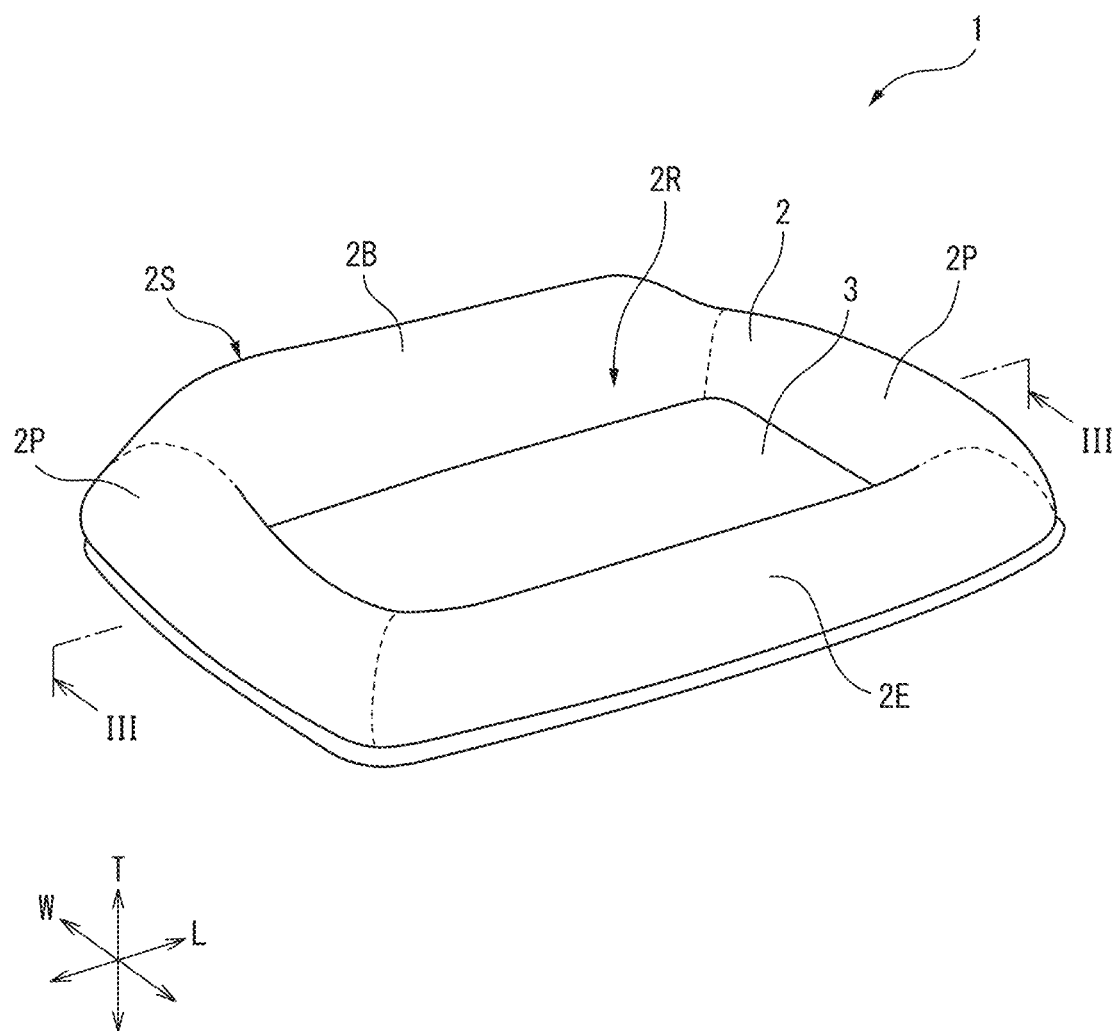
FIG. 1 is a perspective view of a pet bed 1 according to an embodiment of the invention.
Figure 2:
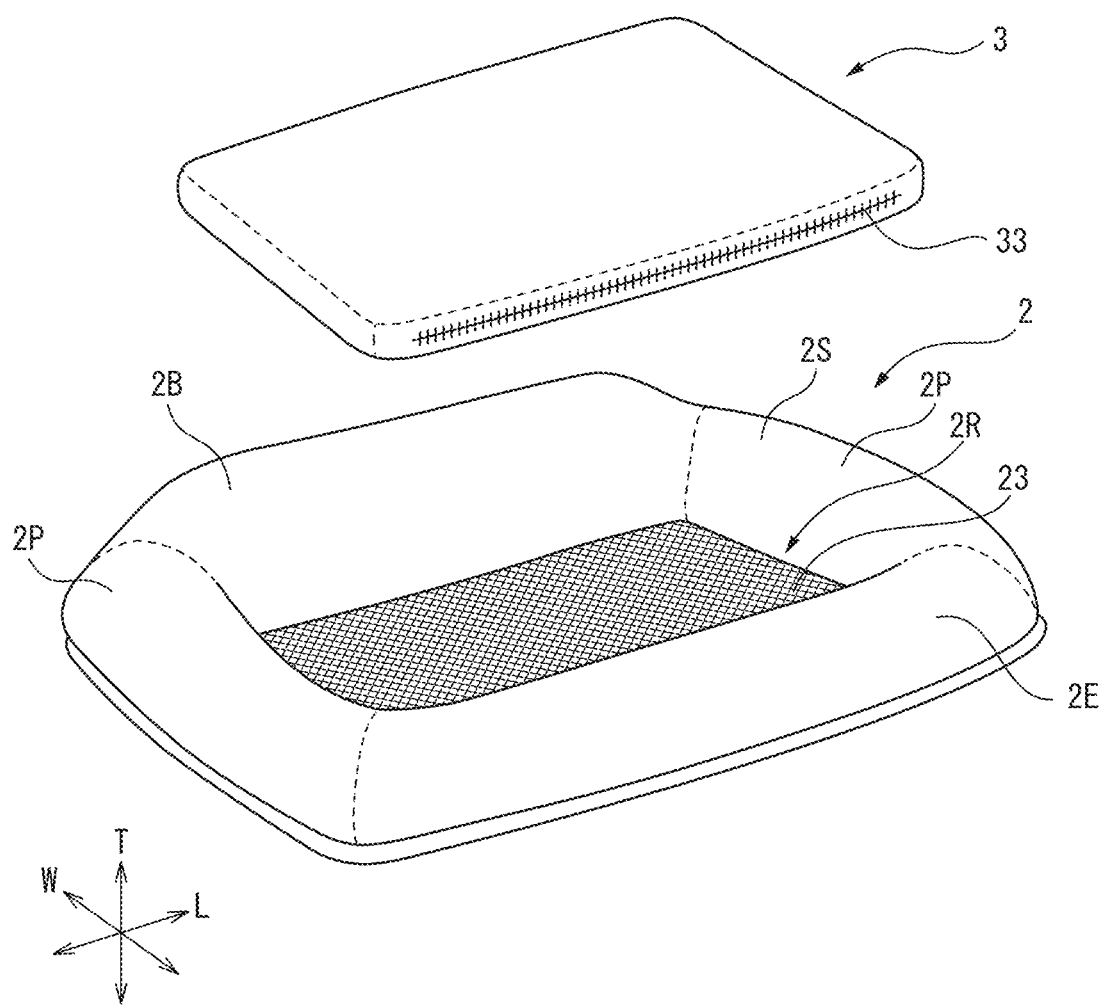
FIG. 2 is an exploded perspective view of the pet bed 1 shown in FIG. 1.
Figure 3:
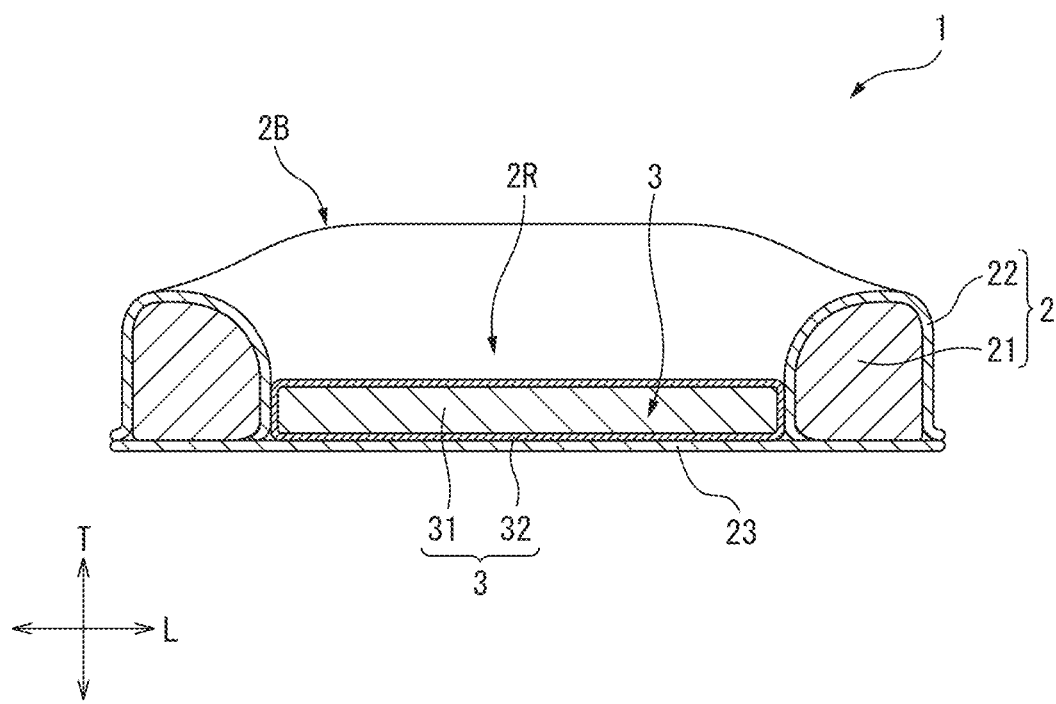
FIG. 3 is a cross-sectional view along line of FIG. 1.

FIG. 1 is a perspective view of a pet bed 1 according to an embodiment of the invention, and FIG. 2 is an exploded perspective view of a pet bed of the invention. FIG. 3 is a cross-sectional view along line of FIG. 1.

(Pet Bed)

As shown in FIGS. 1 to 3, the pet bed 1 according to the embodiment of the invention has a rounded, essentially rectangular outer shape with a lengthwise direction L and a widthwise direction W, in the planar view. According to the invention, the outer shape of the pet bed in the planar view is not limited to the shape of this embodiment, and any desired shape (such as circular, elliptical, square, triangular or star-shaped) may be employed, depending on the size of the pet, the desired design property, etc. The size of the pet bed 1 may be appropriately selected depending on the size and type of pet that will use the bed, and if the pet is a small or medium-sized dog, the length in the lengthwise direction L will be about 400 mm to 1400 mm and the length in the widthwise direction W will be about 250 mm to 1200 mm.

As shown in FIGS. 1 to 3, the pet bed 1 comprises a rim-like frame body 2 running on all sides of an essentially rectangular shape having a lengthwise direction L, a widthwise direction W and a thickness direction T, and an essentially rectangular solid mat 3 having a cushioning property, inserted in a freely detachable manner into the frame body 2.

As shown in FIGS. 1 to 3, the pet bed 1 has the body portion 2S of the frame body 2 rising toward the top side (to a higher height), while the center section surrounded by the body portion 2S is constructed as a recess 2R depressed toward the back side. On the back side of the bottom face of the recess 2R (the bottom side) there is disposed a mat 3 having a cushioning property, that is able to support the body of the pet while diffusing the body pressure of the pet on the bottom face of the recess 2R. The pet therefore lies down in the recess 2R as a lying down area, resting in the recess 2R.

(Frame Body)

The body portion 2S of the frame body 2 forms the perimeter portion of the bed 1, in a manner surrounding the perimeter of the essentially rectangular recess 2R, and in the planar view it has a rim-like shape running along each side of an approximately rectangular shape, with each of the sides connected at the four corners where they meet. The joints at the four corners are sections connecting the four sides, and while they do not directly carry out the functions of the sides as explained below, they continuously (progressively) connect the adjacent sides, and the joints are formed so as to take over the functions of both of the two connected sides and exhibit the functions of the adjacent sides.

As shown in FIG. 1, one of the four sides composing the body portion 2S forming the perimeter portion of the frame body 2 is formed as a frame body high part 2B that rises further toward the top side (to a higher height) than the other sides, allowing it to function as a back rest for the pet that is lying down in the recess 2R. Also, three of the four sides composing the body portion 2S are formed as first frame body low parts 2P and a second frame body low part 2E with lower heights than the aforementioned frame body high part 2B, facilitating entry and exit of the pet into the recess 2R, while also functioning as a pillow that allows resting of the head of the pet lying down in the recess 2R. Particularly when the pet lies down with the back against the frame body high part 2B as one of the rectangular long sides, the first frame body low parts 2P that are the two rectangular short sides adjacent to the frame body high part 2B have lower heights than the frame body high part 2B, and are suitable to function as pillows for the pet. Of the four sides composing the body portion 2S, the long side, other than one long side which is the frame body high part 2B and the two short sides that are the first frame body low parts 2P, can also function as a pet pillow, although it particularly functions as an exit and entrance for the pet. Preferably, therefore, the heights of the two rectangular short sides are formed as first frame body low parts 2P that are lower than the frame body high part, while the height of the other rectangular long side that is parallel to the frame body high part 2B is formed as a second frame body low part 2E having a lower height than the first frame body low parts 2P, to increase its function as an exit and entrance for the pet.

The heights of each of the parts (sides) of the frame body 2 will usually be highest at the center locations in the lengthwise direction and widthwise direction in the planar view of each part, and may be represented as the heights at their center locations, while their average heights may each be used by determining the average values for the maximum heights measured on the border lines (3 locations) between 4 equal portions in their lengthwise direction of each part (excluding the aforementioned joints). The height of each part (each side) of the frame body 2 can be measured by measuring the height with a pressure plate placed on the measuring location of the part and a pressure of 51 Pa applied in the vertical direction. A normal pressure plate size is not problematic, but when the type of pressure plate is problematic due to the measuring location, a pressure plate is used in which the angle of one plane of a 50 mm-diameter disc is chamfered to a section radius of 10 mm (R10), and the thickness with a load of 0.5 N on the pressure plate is measured and the value is recorded as the thickness of the frame body. For a bed 1 according to this aspect, the bottom part of the frame body 2 is set in direct contact with the location where the bed has been placed, and therefore the height of the frame body 2 approximately matches the thickness of the frame body, while the depth of the recess 2R of the frame body 2 is the depth obtained by subtracting the thickness of the mat 3 from the thickness (height) of the frame body.

However, the bottom part of the frame body 2 may also be provided with legs from the viewpoint of air permeability or hygiene, in which case the height of the frame body 2 will be the total height of the legs and the body portion 2S of the frame body, and the thickness of the body portion 2S of the frame body 2 will therefore not match the height of the frame body 2. The height of the bottom part of the mat may also be set to a height that does not match the bottom part of the frame body.

Since the frame body 2 is to function as a back rest and a pillow for the pet it preferably has a prescribed cushioning property, and according to the invention it is formed softer than the mat 3, but since the second frame body low part 2E of the frame body 2 is to function mainly as an exit and entrance, it is preferably formed relatively harder than the frame body high part 2B and first frame body low part 2P in order to facilitate walking when the pet steps on the frame body for entering and exiting the bed. The hardness of each part of the frame body may be measured using a 50 mm-diameter chamfered disc similar to the one used for measurement of the thickness of the frame body described above, and for example, the thickness reduction under compression when compressed under a load of 3.5 N, for example, in order to apply the same pressure, is measured, or the same thickness reduction under compression (for example, 10 mm) is targeted and the load on the pressure plate at that time is measured, for measurement and comparison. If the thickness reduction under compression with a load of 3.5 N applied using the pressure plate is 10 mm or greater, it may be concluded that the frame body has the same cushioning property as a pillow or back rest for a pet. Conversely, the load for a reduction in thickness of the frame body under compression of 10 mm, when a load has been applied using the pressure plate, may be up to 3.5 N, or up to 3 N, up to 2 N or up to 1 N, in which case the frame body exhibits a cushioning property allowing it to be used as a pillow or back rest for a pet.

When the hardness of the frame body is measured using a pressure plate having the angle of one plane of a 50 mm-diameter disc chamfered to a section radius of 10 mm (R10), usually the center location in the lengthwise direction and the center location in the widthwise direction of each part may be measured. If necessary, however, the hardness may be amended by the average value of the hardnesse measured at the centers on the border lines (3 locations) between 4 equal sections of the each part.

As shown in FIG. 3, the body portion 2S of the frame body 2 is constructed by covering a frame body cushion material 21 with a frame body cover 22.

The material composing the frame body cushion material 21 is not particularly restricted, and any cushion material known in the field may be used such as cotton (tree cotton) fibers, urethane foam or foam beads, for example. The material composing the frame body cover 22 is also not particularly restricted and may be, for example, a fabric or synthetic resin sheet made of natural or synthetic fibers. From the viewpoint of fouling resistance and excellent wipeability, it is preferred to use a sheet employing synthetic fibers such as polyester. A knitted fabric or mesh sheet may also be preferably used as a sheet with excellent air permeability. The material composing the frame body cover 22 may be the same material as the mat cover. For fabrication of the frame body 2, for example, a frame body cushion material 21 formed in a prescribed shape may be covered with a frame body cover 22 and sewed, or it may be formed by sewing, or the frame body cushion material 21 may be placed in the frame body cover 22 that has been formed to the prescribed size and sewed to form a frame body of the prescribed size.

The frame body portion 2S may be constructed of an integral body having the aforementioned rim-like structure, or it may be constructed of a combination of different structures (for example, four essentially straight linear structures).

In the frame body recess 2R surrounded by the frame body portion 2S, as shown in FIG. 2, the bottom part 23 is formed by a mesh fabric (for example, a woven fabric or knitted fabric composed of synthetic fibers) that is continuous from the back side of the frame body 2, ensuring air permeability so that the mat 3 inserted into the frame body recess 2R is not filled with moisture. Incidentally, the mesh fabric mentioned above may be rough since it only needs to have strength sufficient to be able to support the mat 3, but it is attached onto the entire back side of the frame body.

The pet bed of the invention is not limited to such a construction, and for example, the body portion (the perimeter portion) of the frame body of the bed may have two of the four sides (excluding the joints) formed as frame body high parts with higher heights (the average values for the heights at 3 locations on lines between 4 equal lengthwise sections, as described above), or all of the four sides may have the same height. Moreover, when the shape of the body portion (the perimeter portion) of the bed frame body in the planar view is circular, part of the circular perimeter portion may be formed as the bed high part with a higher height.

(Mat)

As shown in FIGS. 1 to 3, the mat 3 of the pet bed of this aspect is present in the recess 2R formed by the frame body 2 of the bed 1, and is inserted in a detachable manner into the frame body 2.

As seen in FIG. 2, the mat 3 is an approximately rectangular shape sheet in the planar view, and as shown in the cross-sectional view of FIG. 3, it comprises an interior fiber structure 31 and a mat cover 32 covering the fiber structure 31. The fiber structure 31 is also an approximately rectangular-shaped sheet in the planar view, and can be inserted into and removed from the mat cover 32 through an opening 33 formed in the side of the mat cover 32, for example, the opening 33 being formed by an openable and closeable zipper or button.

The mat 3 of the pet bed of this aspect has lower thickness reduction under compression (sinking depth) than the frame body 2 when subjected to the same pressure. The hardness of the mat can be evaluated by measuring the pressure and compressed thickness reduction (sinking depth) when compressed using a flat plate as a pressure plate. Since the mat 3 and fiber structure 31 will usually be sheet-like, the hardness property can be measured using a flat plate with at least a prescribed area (for example, a diameter of 100 mm), thereby allowing accurate measurement of the hardness (compression property) of the mat 3 and the fiber structure 31. The frame body can be measured using the same pressure plate, allowing simple comparison between the hardness (sinking difficulty) of the mat and the frame body.

However, since the shape of the frame body 2 does not necessarily have a flat top surface and the width is often not very large, for the purpose of comparing the hardness of the mat and the frame body, for example, a pressure plate having the angle of one plane of a 50 mm-diameter disc chamfered to a section radius of 10 mm (R10) may be used, with the surface of the chamfered side of the pressure plate pressed against the frame body and mat, and the reduction in thickness of the frame body and the mat when compressed (the sinking depth) may be compared, when the frame body and mat have been compressed under the same load (pressure). Throughout the present specification, when pressure is applied using the aforementioned pressure plate, the bottom face of the pressure plate is assumed to be a circular flat section with a diameter of 50 mm for calculation of the area (19.6 cm$^2$), and the value obtained by dividing the applied load by this area is recorded as the pressure. When a chamfered pressure plate is to be used to measure the compression property, the real pressure applied to the measured object in the measuring method for the compression property of the mat and the fiber structure described below will not actually be the same, even if compression is with the same pressure value as when pressing using a circular flat plate with a diameter of 100 mm, and consequently it must be considered that the thickness reduction under compression will not necessarily match.

If the reduction in thickness of the mat with compression under a pressure of about 15 kPa using the aforementioned chamfered pressure plate is smaller than the reduction in thickness of the frame body with compression using the same pressure plate and the same pressure, then the mat will be harder than the frame body (it will have less compressed thickness reduction) at a pressure corresponding to the pressure of 4 legs of a pet, and can be considered to have excellent walking stability as a pet bed. Since a pressure of about 15 kPa is assumed to be the pressure of 4 legs of a regular small dog on a mat, if comparison with this pressure shows that the mat has less compressed thickness reduction (sinking depth) than the frame body, then the walking stability will be excellent for the pet.

In a hardness (compression) test at a pressure of about 15 kPa, the difference between the reductions in thickness of the mat and the frame body under compression is preferably 3 mm or greater, and more preferably 5 mm or greater, 8 mm or greater or 10 mm or greater. It will also depend on the type of frame body and mat used, but it may also be 12 mm or greater, 15 mm or greater, 18 mm or greater, 20 mm or greater, 25 mm or greater, or 30 mm or greater.

The thickness of the mat when compressed at a pressure of about 15 kPa using the chamfered pressure plate described above preferably remains at 3 mm or greater. If a minimum thickness remains in the mat even when applying the pressure of the 4 legs of a pet when it walks on the mat, then the mat will be able to receive the legs of the pet and reduce sinking of the legs of the pet, which is beneficial for protecting the legs of the pet. The thickness of the mat during compression is preferably 5 mm or greater or 8 mm or greater. The remaining mat thickness may be 10 mm or greater, 12 mm or greater or 15 mm or greater, but there is no need for any more thickness than necessary.

For the mat 3 of the pet bed of this aspect, when using a pressure plate having the angle of one plane of a 50 mm-diameter disc chamfered to a section radius of 10 mm (R10), the reduction in thickness of the compressed mat when the mat has been compressed with a pressure of 15 kPa by pressing with the surface of the chamfered side of the pressure plate may be greater than 37 mm, but it is preferably no greater than 37 mm. If the compressed thickness reduction is no greater than 37 mm, then for a small dog of regular body weight corresponding to the aforementioned pressure, the sinking depth of the legs of the pet when it is walking is advantageously small enough to protect the legs of the pet, and therefore the walking stability will be excellent for practically all small dogs, which is preferable for protecting the legs of the pet. If the mat has a hardness satisfying the aforementioned conditions, then even if the pet has a smaller body weight, the sinking of the mat will be reduced by the amount of smaller body weight so that the walking stability will also be excellent for pets of smaller body weight. The reduction in thickness of the mat when compressed is more preferably no greater than 35 mm, and even more preferably no greater than 32 mm, no greater than 30 mm, no greater than 27 mm, no greater than 25 mm or no greater than 24 mm, from the viewpoint of protecting the pet. Moreover, the preferred value for the compressed thickness reduction of the mat should be in consideration of the relationship between the type of pet and the thickness and hardness property of the mat.

Figure 4A:
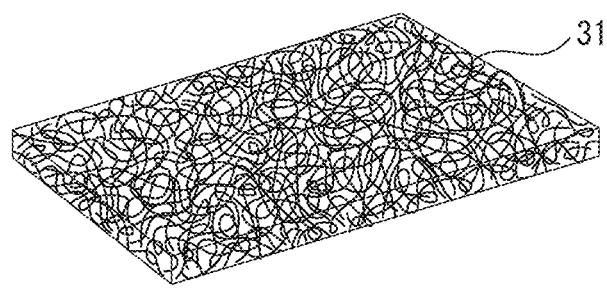
FIGS. 4A to 4C show a perspective view and a partial cross-sectional view of a mat 3 according to the embodiment shown in FIG. 1, and a schematic partial cross-sectional view of a mat according to another embodiment.
Figure 4B:
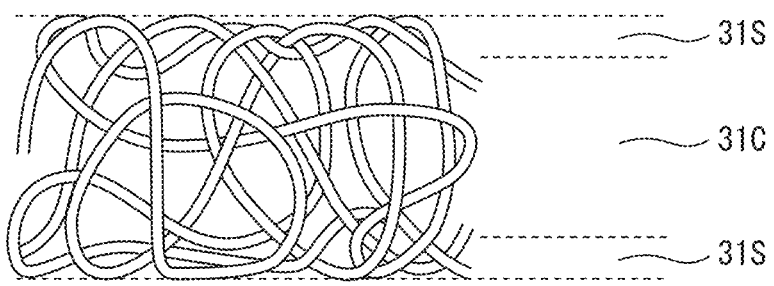

The fiber structure 31 of this aspect, as shown in the perspective view of FIG. 4A and the side view of FIG. 4B, is composed of thermoplastic resin fibers with an average fiber diameter of 0.01 to 5 mm. By using a fiber structure composed of thermoplastic resin fibers having an average fiber diameter of 0.01 to 5 mm for the mat, it is easy to increase the hardness of the mat while also providing a hardness property that is excellent for both the cushioning property and the walking stability of the mat. The average fiber diameter is preferably 0.05 to 3 mm and more preferably 0.1 to 2 mm, 0.3 to 0.8 mm or 0.4 to 0.6 mm. By forming the fiber structure with thermoplastic resin fibers having a large average fiber diameter it is possible to increase the strength and hardness of the fiber structure. Moreover, by using hollow fibers which are thermoplastic resin fibers in the same amount, the strength and hardness of the fiber structure can be increased. One preferred type of fiber structure is a network structure of polyester-based continuous fibers with an average fiber diameter of 0.4 to 0.6 mm fused at their intersections, in the form of a sheet with a density of 0.03 to 0.04 $g/cm^3$ (void percentage of 95% or higher) and a thickness of 35 to 45 mm.

Measurement of the fiber diameters of the fibers composing the fiber structure may be carried out in the following manner. First, fibers of prescribed lengths (for example, 5 mm) are cut out from 10 arbitrary locations of the fiber structure to be measured, and the ends of the cut out fibers are cut perpendicular to the direction in which the fibers extend. The cut surface is photographed at a prescribed magnification, and the fiber diameters (mm) of the fibers are measured as circle equivalent diameters, from the obtained cross-sectional photograph. Incidentally, the value for the fiber diameter is the average value of the fiber diameters of the 10 cut out fibers.

The fiber structure is preferably a web-like structure with thermoplastic resin fibers tangled in a disordered manner and mutually joined. The thermoplastic resin fibers composing the fiber structure may be a polyester-based resin, polyamide-based resin, polyether-based resin or polyolefin-based resin, for example. Non-hydrophilic thermoplastic resin fibers are preferred from the viewpoint of fouling resistance, cleanability and drying properties.

The fiber structure 31 is preferably a fiber structure joined at the intersections between the continuous fibers, and most preferably it is a fiber structure that is joined at the intersections between the continuous fibers and does not include ends of the continuous fibers on the top surface. If the mat is a fiber structure joined at the intersections between the continuous fibers, and especially a web-like fiber structure that is joined at the intersections between the continuous fibers and does not include ends of the continuous fibers on the top surface, then an effect will be provided whereby the fibers in the mat will not be maldistributed and will therefore be less likely to catch on the feet of the pet, and will also have less variation in compressibility, while discomfort caused by the ends of the discontinuous fibers contacting with the foot soles will also be reduced, and the pet will be unlikely to lose balance while walking. In addition, since the continuous fibers extend in the horizontal direction, they have excellent body pressure dispersibility. In particular, when continuous fibers having large fiber diameters and high strength undergo twisting mutually entangled and joined at their intersections, thus forming a web-like continuous fiber structure with a high void percentage, the web-like continuous fibers joined at their intersections act as aggregate springs and exhibit high rebound properties (compressive rebounding properties). If the continuous fibers composing the fiber structure are joined at numerous intersections in the lengthwise direction and the degree of freedom in the lengthwise direction is minimized, force in the thickness direction is received by elastic deformation of the continuous fibers themselves in the thickness direction, resulting in high resistance against compression for the fiber structure as a whole. Furthermore, if the continuous fibers extend in the horizontal direction that is perpendicular to the thickness direction and are joined at their intersections, then pressure applied in the thickness direction of the fiber structure will also be received in the horizontal direction by the continuous fibers that extend in the horizontal direction, thus helping to disperse pressure in the horizontal direction so that pressure from the legs of the pet is received by the larger area of the mat, thus resulting in less sinking.

According to this aspect of the fiber structure 31 wherein the thickness when subjected to a pressure of 3.4 kPa (35 $gf/cm^3$) is preferably 3 mm or greater, the cushioning property of the mat is exhibited by the fiber structure, and therefore if the thickness of the fiber structure is 3 mm or greater when it has been subjected to a pressure of about 3.4 kPa (35 $gf/cm^2$) due to body pressure of a pet, and especially a small dog (the body pressure when lying down), then the mat can exhibit a sufficient cushioning property as a pet bed. Moreover, if the fiber structure has a thickness of 3 mm or greater when subjected to a load of about 3.4 kPa, the mat will retain an elastic (rebounding) reserve force even against leg pressure when a pet, and especially a small dog, is walking, allowing even more excellent walking stability to be provided for the pet. The fiber structure 31 may also have a thickness of 8 mm or greater, 10 mm or greater or 15 mm or greater when subjected to a pressure of 3.4 kPa. A thickness of 20 mm or greater may also be satisfactory in some cases. The upper limit for the thickness is determined not by the thickness of the fiber structure when subjected to a pressure of 3.4 kPa, but rather by whether or not the reduction in thickness of the fiber structure by the compression exhibits a sufficient cushioning property as a pet bed. The reduction in thickness by compression when the fiber structure has been subjected to a pressure of 3.4 kPa is preferably 15 mm or greater and even more preferably 20 mm or greater, considering the body pressure of a pet, and especially a small dog, when lying down.

In order to measure the thickness of the fiber structure when subjected to a prescribed pressure, a pressure plate with at least a certain area (for example, having a circular shape with a diameter of 100 mm) may be pressed against the fiber structure with a prescribed pressure, and the thickness of the fiber structure measured at that time. The thickness under an initial pressure of 51 Pa is used as the zero point for the thickness measurement.

The fiber structure preferably has a reduction in thickness in the range of 13 to 22 mm when compressed at a pressure of 3.4 kPa, and a reduction in thickness of no greater than 35 mm when compressed with a pressure of 15 kPa. If the fiber structure has a reduction in thickness in the range of 13 to 22 mm when compressed by a pressure of about 3.4 kPa due to the body pressure when a pet, and especially a small dog, is lying down, then the fiber structure will have a soft cushioning property (sinking depth) that will fit the pet. Furthermore, if the fiber structure has a reduction in thickness of no greater than 35 mm when compressed by a pressure of about 15 kPa, which is assumed to be received from the legs when a pet, and especially a regular small dog, is walking, then the degree of sinking on the mat as a whole will be minimal when the pet is walking, and therefore the walking stability will be remarkably superior for all pets including that pet (including pets of lighter body weight than the pet). Fiber structures having such a compression (elasticity) property can be produced or obtained by adjusting the fiber material, fiber diameter and fiber length, selecting solid fibers and hollow fibers and their combinations, and adjusting the method of tangling the fibers or their void percentage, density and layered structure, and they are highly practical. The reduction in thickness when compressed with a pressure of about 15 kPa is more preferably no greater than 32 mm, and even more preferably no greater than 30 mm, no greater than 27 mm, no greater than 25 mm or no greater than 24 mm, from the viewpoint of protecting the pet. The fiber structure according to one preferred aspect has a reduction in thickness in the range of 15 to 18 mm when compressed at a pressure of 3.4 kPa, a reduction in thickness in the range of 22 to 27 mm when compressed at a pressure of 10 kPa, and a reduction in thickness of 30 to 35 mm when compressed with a pressure of 15 kPa.

The fiber structure is preferably a sheet with a thickness of 20 to 80 mm. If the fiber structure that provides the cushioning property is a sheet with a thickness of 20 to 80 mm, the mat will be able to easily exhibit excellent hardness properties in terms of both a cushioning property to fit the body of a pet, and especially a small dog, when the pet is lying down, and walking stability for the pet, as described above. The thickness of the fiber structure is preferably about 25 to 60 mm, and more preferably about 30 to 50 mm or about 45 to 55 mm. The thickness of the fiber structure is measured by pressing a flat plate with a diameter of 100 mm onto the fiber structure and measuring the thickness under an applied pressure of 51 N, and calculating the average value obtained from measurement at three or more arbitrary locations of the fiber structure, as the thickness.

If the fiber structure is a fiber structure wherein thermoplastic resin fibers having an average fiber diameter of 0.01 to 5 mm are joined (especially fused) at the intersections between the continuous fibers, it can function as a cushion having the compression (elasticity) property described above. The fiber structure composed of such continuous fibers is preferably a network structure, and it preferably has the average fiber diameter and thickness described above and a void percentage of 90% or higher, in order to obtain the aforementioned preferred compression (elasticity) property. The density of the fiber structure may be 0.01 to 0.2 g/cm$^3$, but it is preferably 0.01 to 0.1 g/cm$^3$ and more preferably 0.02 to 0.05 g/cm$^3$ or 0.03 to 0.04 g/cm$^3$.

The void percentage of the fiber structure can be determined by cutting out a sample with a size of 15 cm×15 cm from the fiber structure to be measured while maintaining its thickness, immersing the sample in an appropriate liquid to measure the volume occupied by the fibers of the fiber structure (the fiber volume), and then dividing the fiber volume by the apparent volume of the fiber structure and multiplying by 100 to calculate the vol % of the fibers, and finally subtracting the vol % from 100%. If the liquid does not infiltrate the hollow interiors of the hollow fibers when they are immersed in the liquid, the density measured by the method described above is considered to be the density of the hollow fibers. The apparent volume of the fiber structure is obtained by calculation from the outer dimensions of the fiber structure (15 cm×15 cm×thickness for the sample mentioned above), where the method of measuring the thickness of the fiber structure is as described above. The void percentage of the fiber structure can be calculated as an approximate number from the density of the fiber structure and the density of the fibers. For example, for a density of 0.035 g/cm$^3$, and a fiber (polyester) density of 1.35 g/cm$^3$, the void percentage is (1.35-0.035)/1.35=97.4%.

The density (apparent density) of the fiber structure can be measured in the following manner. First, a sample with dimensions of 15 cm×15 cm is cut out from the fiber structure to be measured without altering the thickness, and the sample mass (g) is measured. Next, the thickness (cm) of the cut out sample is measured, and the size dimension is multiplied by the thickness to calculate the sample volume (cm$^3$). By dividing the final sample mass by the volume, it is possible to obtain a value for the density (apparent density) (g/cm$^3$). The thickness measurement for measurement of the density (apparent density) of the fiber structure differs from measurement of the thicknesses of the frame body and mat of the bed, in that a ruler is used without application of pressure. When the fiber structure does not have a constant thickness, the object to be measured is placed on a horizontal plane and the height (the distance from the horizontal plane to the top surface of the object to be measured) is measured at 4 arbitrary locations, recording the average value.

While not being limitative, preferably, the fiber structure has a surface layer 31S on the top side and an inner layer 31C directly below the surface layer, as shown in FIG. 4B, and the density of the surface layer 31S is higher than the density of the inner layer 31C. The surface layer 31S is a layer containing fibers that form the front side of the fiber structure, and its thickness may be 1 to 3 mm, for example. The presence of the surface layer 31S and the inner layer 31C, and their difference in density, are sufficient if it can be confirmed visually that the fiber structure differs in fiber density in a laminar fashion from the top surface toward the inner wall in the thickness direction. By using the surface layer 31S of the fiber structure on the top side of the mat, the density of the surface layer of the fiber structure that contacts with the pet is higher than the density of the interior, and therefore the number of junctions between the fibers in the surface layer is increased while the fiber structure has its flexibility maintained, and the compressive load acting on the mat by the pet is diffused as the fibers surrounding the region contacting with the pet are engulfed, thus allowing the body pressure dispersibility to be increased and further reducing the degree of sinking of the body and legs of the pet under its body weight.

The fiber structure may also comprise a laminate of several fiber structure layers with different hardnesses. If the fiber structure comprises a laminate of several fiber structure layers with different hardnesses, it will be possible to combine a layer having a soft cushioning property that fits the pet and a layer having a hard cushioning property (rebounding force) with satisfactory walking stability, thus providing an effect whereby a fiber structure exhibiting both a soft cushioning property (fitting property) and a hard cushioning property (walking stability) for the fiber structure as a whole can be easily produced.

Figure 4C:
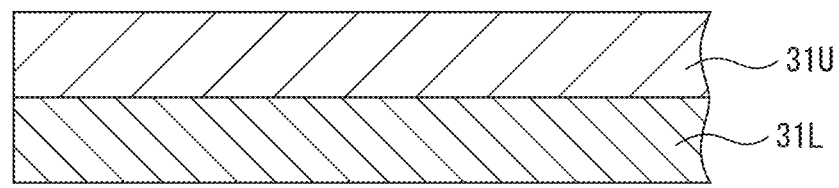

In particular, if the fiber structure is a laminate comprising a relatively soft layer 31U and a hard layer 31L, as shown in FIG. 4C, it will be possible to obtain a construction with an excellent cushioning property to fit the body of the pet under body pressure of the pet, by the soft layer 31U, and excellent walking stability that reduces sinking of the mat, by the hard layer 31L. The relatively soft layer 31U and the hard layer 31L may be in any vertical order, but in order to achieve fitting to the body of the pet, preferably the soft layer 31U is situated on the top side of the mat 3 that contacts with the pet.

The laminate comprising the relatively soft layer 31U and hard layer 31L may be a laminate of two fiber structure layers with different fiber structure fiber diameters and fiber densities, or the fiber structure used may be a two-layer laminate comprising a fiber structure layer containing no hollow fibers and a fiber structure layer containing hollow fibers. Using such a fiber structure, and especially the latter, with the fiber structure layer containing no hollow fibers disposed on the top side of the mat, is preferred because the top side that contacts with the pet will have a soft cushioning property to fit the pet, while the bottom side of the fiber structure layer that does not contact with the pet will be able to exhibit increased hardness (strength) due to the presence of the hollow fibers, thus decreasing the degree of sinking of the fiber structure as a whole and allowing it to exhibit an excellent compression property in terms of walking stability for the pet.

(Examples of Fiber Structure)

The results of measuring the compression property of a fiber structure (sample 1), as one example of a fiber structure which is a fiber structure wherein continuous solid fibers of polyester are entangled and fused together at their intersections in the form of a sheet with dimensions of 200 mm×200 mm and a thickness of 40 mm, and having an average fiber diameter of 0.5 mm and a density of 35 kg/m$^3$, are shown below together with the method of measurement used.

Also, Table 1 below shows the results of measuring the compression property of a fiber structure as another example of a fiber structure, which is a fiber structure wherein continuous fibers of polyester are entangled and fused together at their intersections in the form of a sheet with dimensions of 200 mm×200 mm and a thickness of 40 mm, but also in the form of a laminate of 20 mm-thick layers, one layer being composed of solid fibers with an average fiber diameter of 0.5 mm and the other layer being composed of hollow fibers with an average fiber diameter of 0.65 mm, and both layers having a density of 35 kg/m$^3$. However, the densities of the solid fibers and hollow fibers are the densities calculated from the masses of the added materials, and the solid fibers and hollow fibers with different average fiber diameters were produced using synthetic resins of the same mass.

(Measuring Method)

Defining the zero point as the thickness of the sample under an initial pressure of 51 Pa using a pressure plate with a diameter of 100 mm, the pressure plate was used for compression to 75% of the thickness of the sample at a pressure plate speed of 100 mm/min, and the pressure plate was returned to the zero point at the same pressure plate speed, as precompression. Next, compression was initiated at the same pressure plate speed, and the pressure at compression to 25% of the thickness of the sample, and likewise the pressures at compression to 40%, 50%, 60%, 65%, 70%, 75% and 77.5% of the thickness, were recorded as the 25% compression hardness, 40% compression hardness, 50% compression hardness, 60% compression hardness, 65% compression hardness, 70% compression hardness, 75% compression hardness and 77.5% compression hardness, respectively.

(Results)

TABLE 1

| Thickness reduction by compression (mm) | 14 mm | 16 mm | 20 mm | 24 mm | 26 mm | 28 mm | 30 mm | 31 mm |
|---|---|---|---|---|---|---|---|---|
| % Compression | 25% | 40% | 50% | 60% | 65% | 70% | 75% | 77.5% |
| Solid fibers (kPa) | 1.6 | 2.5 | 3.5 | 4.5 | 5.7 | 7.6 | 8.3 | 12.2 |
| Laminate (kPa) | 1.3 | 2.4 | 3.8 | 5.7 | 7.6 | 10.8 | 16.5 | 19.0 |

Since all of the fiber structures characteristically exhibited low hardness in the low-pressure region and a large rate of hardness increase in the high-pressure region, they were suitable for use in a mat for a pet bed according to the invention.

With sample 1 (solid fibers), the thickness reduction and compressibility ratio by compression with a pressure of 3.4 kPa were 19 mm and 48%, respectively, and the thickness reduction and compressibility ratio by compression with a pressure of 15 kPa were 32 mm and 80%, respectively, with 3 mm or more of the thickness remaining in both cases.

With sample 2 (laminate), the thickness reduction and compressibility ratio by compression with a pressure of 3.4 kPa were 18 mm and 46%, respectively, and the thickness reduction and compressibility ratio by compression with a pressure of 15 kPa were 29 mm and 74%, respectively, with 3 mm or more of the thickness remaining in both cases.

Moreover, in a fiber structure with the same density, the fiber structure that was a laminate of a layer of solid fibers and a layer of hollow fibers had slightly lower hardness in the low-pressure region and higher hardness in the high-pressure region compared to the fiber structure of solid fibers alone, and therefore was demonstrated to be more satisfactory as a mat for the pet bed of the invention.

(Moisture Drying Property)

Since a fiber structure composed of thermoplastic fibers has an excellent moisture drying property, it is suitable as a constituent material for a mat of a pet bed. In particular, since the fiber structure is composed of non-hydrophilic thermoplastic fibers, it can be easily washed and allows a mat with an excellent drying property to be obtained.

When a mat with such excellent washing and drying properties is constructed so as to be inserted in a detachable manner into a frame body, the mat which is easily fouled can be detached from the frame body for washing of the mat alone, while the mat also has an excellent drying property, thus providing the advantage of allowing shortening of the time required for washing and drying of the bed, during which time the dog cannot use the bed.

The mat cover of the mat may also be constructed of a material with excellent washing and drying properties. If the mat cover is formed of a fabric made of thermoplastic fibers, for example, and especially a net-like fabric, then the washing and drying property will be excellent and the air permeability and liquid permeability will also be excellent, and therefore if it is used as a mat for a pet bed, the air permeability and liquid permeability will be excellent, and as a result, the front side of the mat will be less likely to become wet when leakage of liquid excreta such as urine has occurred from the pet, and the pet that contacts with the mat will be unlikely to become stuffy, so that the pet will not only experience a better feeling during use of the bed, but even after the mat has become fouled, the excellent washing and drying properties will provide a better experience during use for both the owner and the pet.

(Pet Bed Fabrication Example)

An example of a pet bed having the shape and structure shown in FIGS. 1 to 3 was fabricated. The length of the bed 1 and the frame body 2 in the lengthwise direction L was about 590 m at the longest point, and the length in the widthwise direction W was about 460 mm at the longest point.

The mat 3 is a fiber structure wherein polyester continuous solid fibers are entangled and fused together at their intersections, and is in the form of a sheet with dimensions of about 390 mm×about 240 mm and a thickness of about 40 mm, the fiber structure having an average fiber diameter of 1.0 mm and a density of 35 kg/m$^3$ (the same as sample 1, except for the outer dimensions), and it is housed in a mat cover made of a mesh-like polyester fabric.

The frame body 2 consists of the frame body high part (back rest) 2B and the second frame body low part (entry) 2E, as the long sides of the rectangle, and the first frame body low parts (pillow members) 2P as the short sides of the rectangle, with staple fiber cotton having an average fiber diameter of 0.02 mm and an average fiber length of 20 mm being stuffed into a mesh-like polyester fabric frame body cover made of the same material as the mat cover. The recess 2R of the frame body 2 that is to receive the mat 3 is rectangular with dimensions of about 390 mm×about 240 mm. The frame body high part (back rest) 2B has a width of about 130 mm and a height of about 120 mm, the second frame body low part (entry) 2E has a width of about 100 mm and a height of about 70 mm, and the first frame body low parts (pillow members) 2P each have a width of about 90 mm and a height of about 85 mm. The length, width and thickness of each part of the frame body mentioned here are the maximum length (the length of the part of each side including the joint), maximum width and maximum height as measured with a ruler against the bed. Each part of the frame body is a rounded long shape (rod shape) wherein the width in the lengthwise direction and the thickness (height) both have their maximum width and maximum height at approximately the center section from both ends.

The pressure plate used was a disc with a diameter of 50 mm and a thickness of 25 mm having the circumferential edge of the flat section on one side of the disc chamfered (R10: 10 mm section radius), the chamfered side being the side that is to be pressed against the object. Defining the zero point as the thickness under an initial pressure of 51 Pa using this pressure plate, the pressure plate was used for compression of the sample to 75% of its thickness at a pressure plate speed of 100 mm/min, and the pressure plate was returned to the zero point at the same pressure plate speed, as precompression. Next, compression was initiated at the same pressure plate speed, the load on the pressure plate at 10 mm compression from the zero point was recorded as the 10 mm compressive load, the load on the pressure plate at 20 mm compression was recorded as the 20 mm compressive load, as indicators of the hardness.

The results are shown in Table 2.

TABLE 2

| Units | Thickness (mm) | Under 10 mm compression | | Under 20 mm compression | |
|---|---|---|---|---|---|
| | | Load (N) | Pressure (kPa) | Load (N) | Pressure (kPa) |
| Frame entrance and exit | 70.9 | 2.4 | 1.2 | 6.0 | 3.1 |
| Frame pillow | 84.8 | 1.1 | 0.56 | 4.2 | 2.1 |
| Frame back rest | 117.7 | 0.8 | 0.41 | 4.2 | 2.1 |
| Mat | 46.7 | 4.6 | 2.3 | 12.7 | 6.5 |

The fiber structure forming the mat has the same compression property as sample 1 shown in Table 1.

With this pet bed, a small dog will have its four legs stabilized when it walks on the mat, and therefore for dogs as well, a feeling of assurance may be provided in comparison to a conventional small dog bed.

The pet bed 1 of the invention is used with the recess 2R facing upward, as shown in FIG. 1, at a prescribed location in the pet's living space (for example, indoors), allowing the pet to freely enter and exit the recess 2R for resting. Incidentally, the pet bed 1 may be set directly on the floor surface or ground of the living space, or it may be set via a prescribed holder, mat or the like.

The pet that is to use the pet bed of the invention is not particularly restricted so long as it is an animal that can be kept as a pet, and it may be a mammal such as a dog, cat or rabbit, but since dog joints are particularly weak, it may be most satisfactorily used for dogs, and especially small dogs.

Other Embodiment

Figure 5:
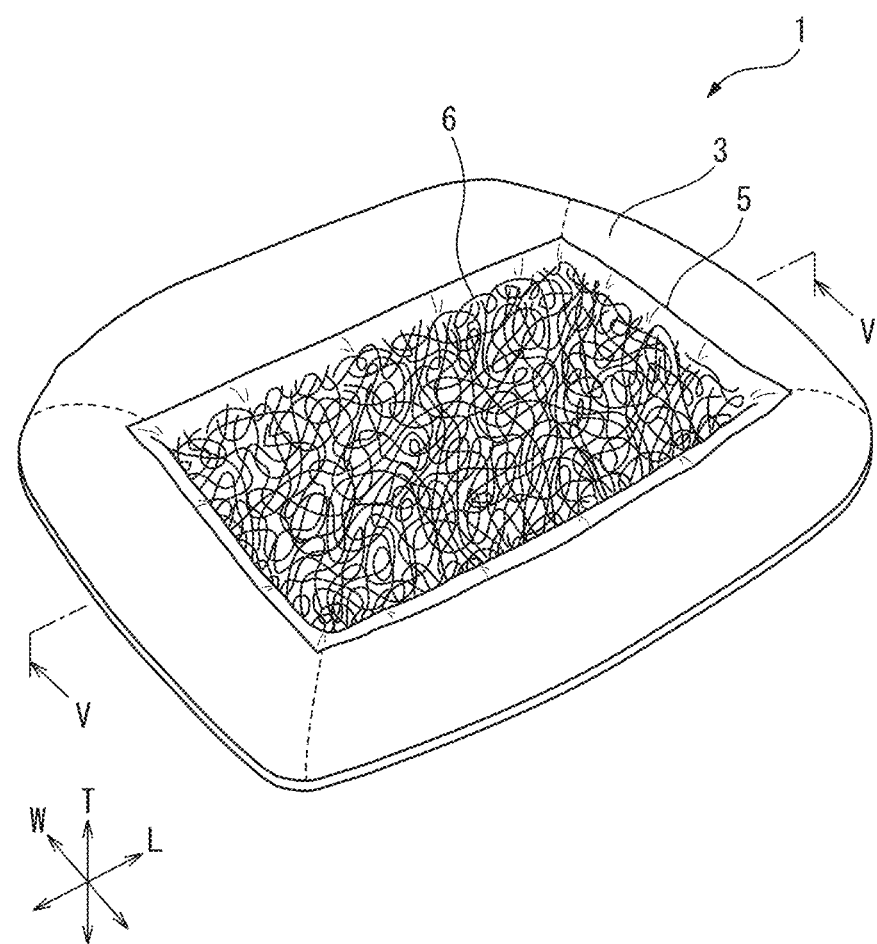
FIG. 5 is a perspective view of a pet bed 1 according to another embodiment of the invention.
Figure 6:
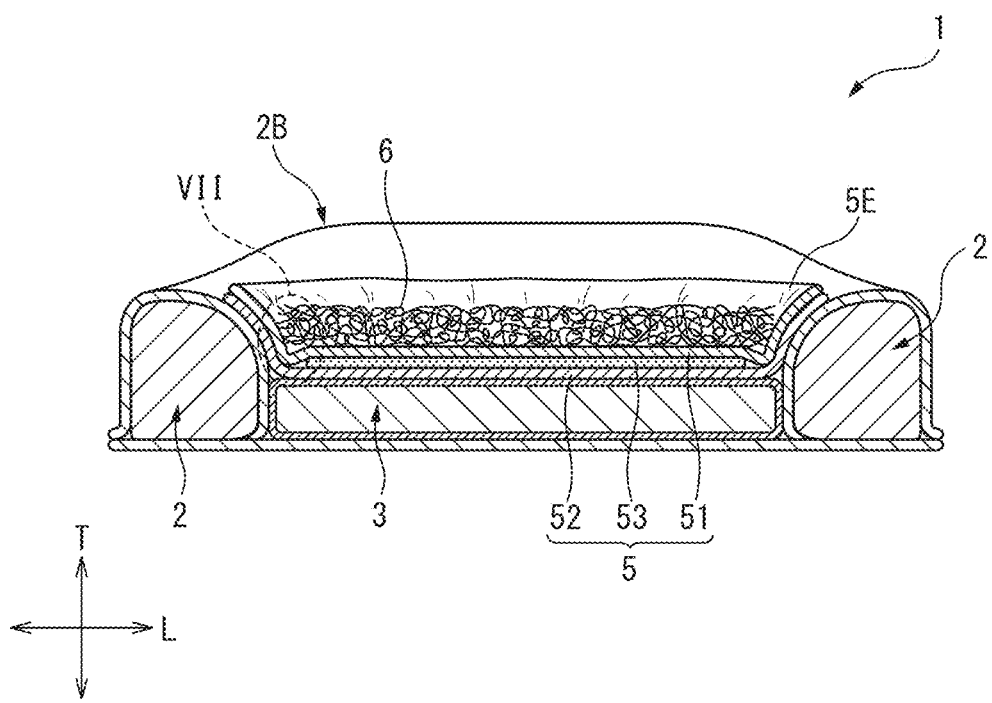
FIG. 6 is a cross-sectional view along line V-V of FIG. 5.
Figure 7:
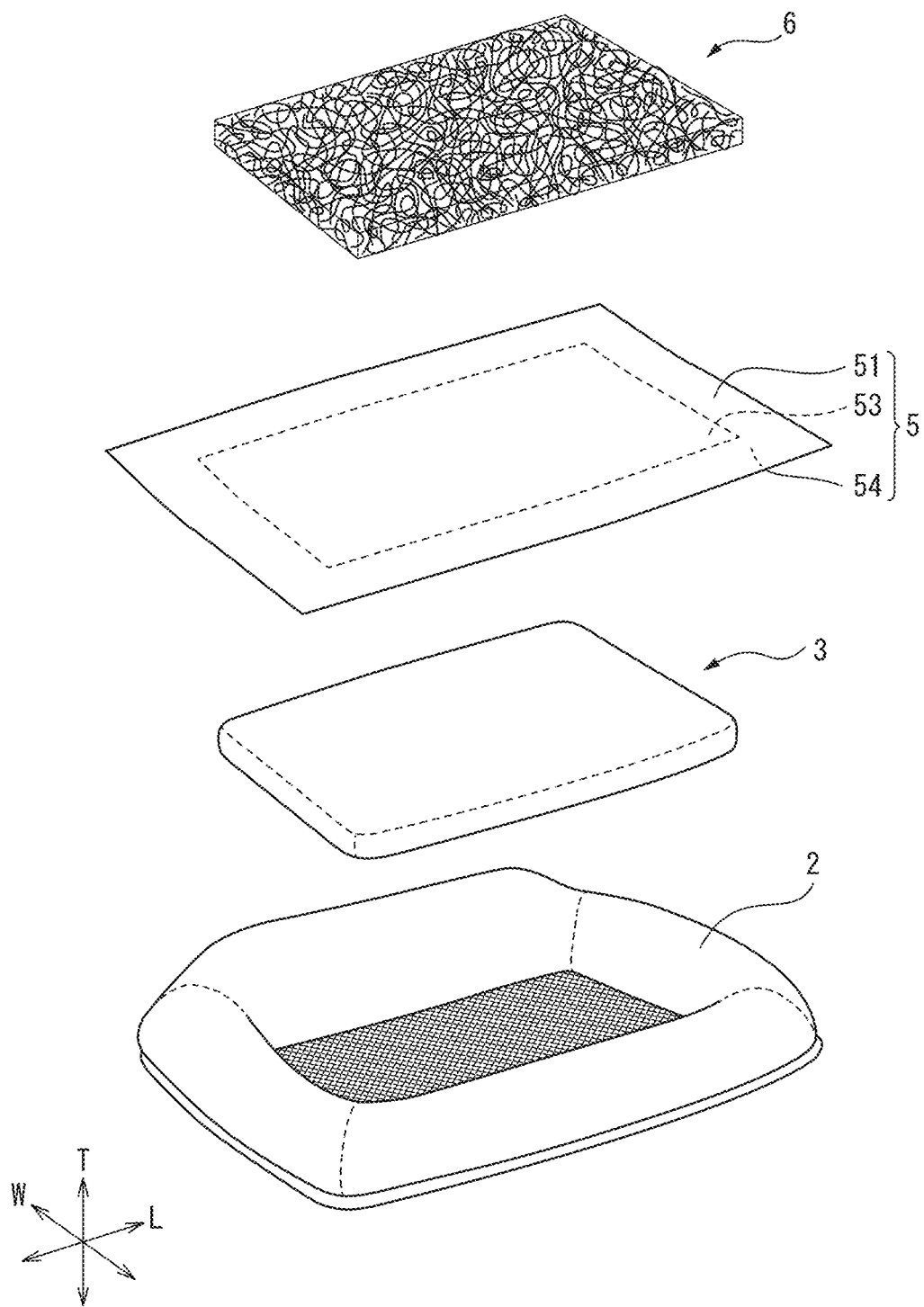
FIG. 7 is an exploded perspective view of the pet bed 1 shown in FIG. 5.
Figure 8:
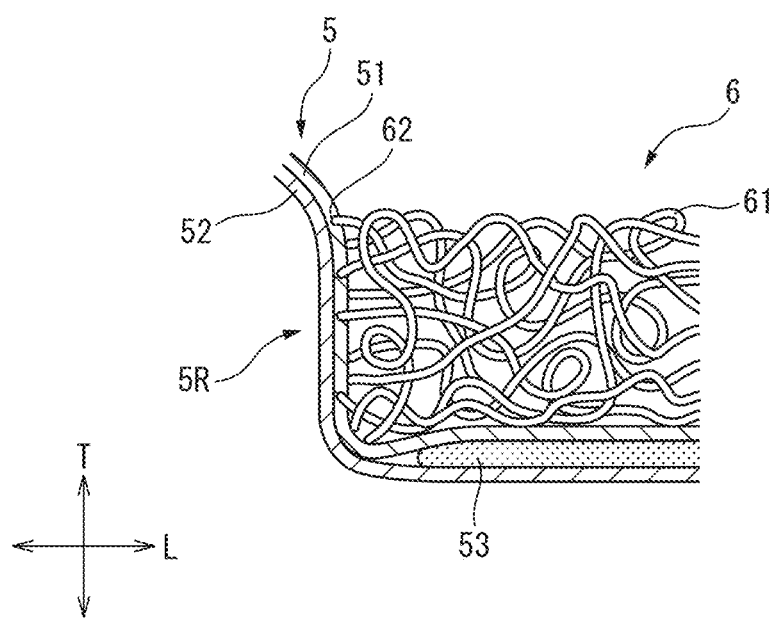
FIG. 8 is a magnified end view of section VII of FIG. 6.

Another embodiment of the pet bed of the invention will now be described with reference to FIGS. 5 to 8. FIG. 5 is a perspective view of a pet bed according to another embodiment of the invention, FIG. 6 is a cross-sectional view along line V-V of FIG. 5, FIG. 7 is an exploded perspective view of the pet bed of FIG. 5, and FIG. 8 is a magnified end view of portion VII of FIG. 6.

This embodiment is a bed suitable primarily for a pet that requires nursing, and especially a dog that requires nursing.

The frame body 2, mat 3 and other members of the pet bed shown in FIGS. 5 to 8 that are also shown in FIGS. 1 to 4 are the same as in FIGS. 1 to 4, and they are indicated by like reference numerals and will not be explained again. In FIGS. 5 to 8, the mat 3 is inserted into the frame body 2 in a freely detachable manner, and the pet bed 1 comprises an absorbent sheet 5 on the top surface of the mat 3, the absorbent sheet 5 having a larger planar area in the extended state than the planar area of the top surface of the mat 3. The absorbent sheet 5 is a multilayer structure having an absorbent core 53 sandwiched between a liquid-permeable sheet 51 and a liquid-impermeable sheet 52.

Since the pet bed of this aspect comprises an absorbent sheet 5 on the top surface of the mat 3, when a bedridden pet that cannot stand on its own has discharged liquid excreta such as urine onto the bed, or when the pet has been washed with a washing fluid on the bed, the liquid excreta or washing fluid (hereunder referred to as "liquid excreta") can be absorbed and retained in the absorbent sheet 5.

Moreover, since the absorbent sheet 5 in the pet bed of this aspect has a planar area in the extended state that is larger than the planar area of the top surface of the mat 3, when the absorbent sheet 5 is situated on the top surface of the mat 3, the outer perimeter edges of the absorbent sheet 5 rise toward the top side along the inner peripheral wall faces of the frame body, allowing formation of standing sections 5E that function as anti-leakage walls. Due to the standing sections 5E, leakage from the absorbent sheet 5 (so-called transmitted leakage) can be prevented, even when liquid excreta and the like are diffused through the front side of the body of the pet outward in the in-plane direction of the absorbent sheet 5.

The pet bed of this aspect can therefore maintain the bed main body in a clean state to provide a satisfactory hygienic condition.

In addition, the pet bed comprises a liquid-permeable cushion material 6 with a thickness of 5 mm or greater on the top surface of the absorbent sheet 5, the cushion material 6 comprising a second fiber structure composed of thermoplastic resin fibers having an average fiber diameter of 0.01 mm to 5 mm, the second fiber structure having the ends 62 of fibers 61 composing the second fiber structure on the sides running in the thickness direction, and the ends 62 being engaged with the absorbent sheet 5.

The pet bed of this aspect comprises a liquid-permeable cushion material 6 having a thickness of 5 mm or greater on the top surface of the absorbent sheet 5, the cushion material 6 being made of a second fiber structure composed of thermoplastic resin fibers having an average fiber diameter of 0.01 mm to 5 mm Since the pet bed of this aspect comprises a liquid-permeable cushion material 6 with a thickness of 5 mm or greater on the top surface of the absorbent sheet 5, even when a bedridden pet that cannot stand on its own has discharged liquid excreta such as urine on the bed, the liquid excreta can permeate the cushion material 6 and be absorbed into the absorbent sheet 5, while the cushion material 6 having a thickness of 5 mm or greater can prevent the pet on the cushion material 6 from being wetted by liquid excreta, and can prevent bedsores for the bedridden pet.

Furthermore, since the second fiber structure has the ends of the fibers of the fiber structure on the sides running in the thickness direction, those ends being engaged with the absorbent sheet, the standing sections of the absorbent sheet 5 are maintained by the ends 62 of the fibers 61 extending on the sides of the second fiber structure, making it possible for the standing sections to more reliably maintain their standing state.

It is thus possible for the pet bed of this aspect to even more reliably exhibit the function and effect exhibited by the standing sections of the absorbent sheet.

The features of the pet bed of this aspect may be described as follows, in relation to aspects 1 to 12 above.

(Aspect 13)

The pet bed according to any one of aspects 1 to 12, wherein the mat is inserted into the frame body in a freely detachable manner, the pet bed comprises an absorbent sheet on the top surface of the mat, and the absorbent sheet has a larger planar area in the extended state than the planar area of the top surface of the mat.

(Aspect 14)

The pet bed according to aspect 13, wherein the pet bed comprises a liquid-permeable cushion material with a thickness of 5 mm or greater on the top surface of the absorbent sheet, the cushion material comprises a second fiber structure composed of thermoplastic resin fibers having an average fiber diameter of 0.01 mm to 5 mm, the second fiber structure has the ends of fibers composing the second fiber structure on the sides running in the thickness direction, and the ends are engaged with the absorbent sheet.

INDUSTRIAL APPLICABILITY

The invention may be utilized as a pet bed that is easy to walk on, is unlikely to damage joints, and has high walking stability, for a pet such as a dog.

The invention claimed is:

1. A pet bed, comprising:
a frame body with a cushioning property; and
a mat with a cushioning property enclosed in the frame body,
the frame body and the mat each having a height and a thickness in a same direction as the height,
the height of the frame body being higher than the height of the mat,
wherein
the mat includes a fiber structure and a mat cover covering the fiber structure,
the fiber structure is a web-shaped structure with thermoplastic resin continuous fibers having an average fiber diameter of 0.01 to 5 mm, tangled in a disordered manner and mutually joined,
the mat includes a material harder than the frame body,
when the frame body and the mat are compressed under a same pressure, a reduction in the thickness of the mat when compressed is smaller than a reduction in the thickness of the frame body when compressed,
the fiber structure has a thickness in the same direction as the thickness of the mat,
a reduction in the thickness of the fiber structure is in the range of 13 to 22 mm when the fiber structure is compressed at a pressure of 3.4 kPa, and
the reduction in the thickness of the fiber structure is not greater than 35 mm when the fiber structure is compressed with a pressure of 15 kPa.

2. The pet bed according to claim 1, wherein when the frame body and the mat are compressed at a pressure of 15 kPa, the reduction in the thickness of the mat when compressed is less than the reduction in the thickness of the frame body when compressed.

3. The pet bed according to claim 1, wherein
the mat has a planar direction and a thickness direction,
in the fiber structure, the thermoplastic resin continuous fibers are joined at intersections between the thermoplastic resin continuous fibers, and
the fiber structure does not include ends of the thermoplastic resin continuous fibers on a top surface of the fiber structure.

4. The pet bed according to claim 1, wherein
the fiber structure has
a surface layer on a top side of the mat; and
an inner layer directly under the surface layer, a density of the surface layer being greater than a density of the inner layer.

5. The pet bed according to claim 1, wherein the fiber structure is a laminate of two fiber structure layers comprising:
a layer containing no hollow fibers, and
a layer containing hollow fibers, the fiber structure layer containing no hollow fibers being disposed on a top side of the mat.

6. The pet bed according to claim 1, wherein the reduction in the thickness of the frame body is 10 mm or greater under compression, when using a pressure plate having an angle of one plane of a 50 mm-diameter disc chamfered to a section radius of 10 mm (R10), and pressing a surface of the chamfered side of the pressure plate against the frame body to produce a load of 3.5 N on the pressure plate.

7. The pet bed according to claim 1, wherein the mat is inserted in a detachable manner into the frame body, and has a more excellent moisture drying property after washing than the frame body.

8. The pet bed according to claim 1, wherein
the mat has an approximately rectangular outer shape in a planar view, and
the frame body surrounds the approximately rectangular outer shape of the mat and has two long sides and two short sides that are each essentially mutually parallel, the frame body having on one of the long sides a frame body high part with a greater height than the other three sides.

9. The pet bed according to claim 8, wherein
the frame body has first frame body low parts on the two short sides and a second frame body low part on the other long side that extends essentially parallel to the frame body high part, and
the second frame body low part has a lower height than the first frame body low parts.

\* \* \* \* \*